(12) United States Patent
Held et al.

(10) Patent No.: US 9,486,809 B2
(45) Date of Patent: Nov. 8, 2016

(54) USE OF TEMPERATURE MEASUREMENTS FOR INDIRECT MEASUREMENT OF PROCESS VARIABLES IN MILLING SYSTEMS

(75) Inventors: Harald Held, Haar (DE); Michael Metzger, Markt Schwaben (DE); Florian Steinke, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 519 days.

(21) Appl. No.: 13/990,670

(22) PCT Filed: Oct. 4, 2011

(86) PCT No.: PCT/EP2011/067248
§ 371 (c)(1),
(2), (4) Date: May 30, 2013

(87) PCT Pub. No.: WO2012/072315
PCT Pub. Date: Jun. 7, 2012

(65) Prior Publication Data
US 2013/0248626 A1    Sep. 26, 2013

(30) Foreign Application Priority Data
Nov. 30, 2010   (DE) .................. 10 2010 062 204

(51) Int. Cl.
B02C 25/00    (2006.01)
G05B 13/04    (2006.01)

(52) U.S. Cl.
CPC ............ *B02C 25/00* (2013.01); *G05B 13/041* (2013.01)

(58) Field of Classification Search
CPC ........................... B02C 25/00; G05B 13/041
USPC ........................................ 241/30, 33–37, 21
See application file for complete search history.

(56) References Cited

U.S. PATENT DOCUMENTS 6,874,366 B2    4/2005   Magne Ortega et al. ...... 73/649

FOREIGN PATENT DOCUMENTS

| DE | 19922449 A1 | 11/2000 | ............ B02C 23/12 |
| WO | 2007/110466 A1 | 10/2007 | ............ B02C 25/00 |
| WO | 2007/124981 A1 | 11/2007 | ............ B02C 25/00 |
| WO | 2012/072315 A2 | 6/2012 | ............ B02C 25/00 |

OTHER PUBLICATIONS

Australian Office Action, Application No. 2011335385, 2 pages, Oct. 15, 2014.

(Continued)

*Primary Examiner* — Mark Rosenbaum
(74) *Attorney, Agent, or Firm* — Slayden Grubert Beard PLLC

(57) ABSTRACT

A method is disclosed for operating a mill at continuous input and output mass flows, and to the mill, wherein a process model based on power balance equations and mass balance equations is used. Characteristic process variables can be measured in a simple manner outside the mill. Characteristic process variables which are still not known can be ascertained by means of inserting the measured values into a respective power balance equation, assuming that the other process variables are in each case known or are insignificant. On this basis, the mill can be actuated in an optimum manner in order to provide a high output power.

20 Claims, 2 Drawing Sheets

(56) References Cited

OTHER PUBLICATIONS

Rajamani, Raj K. et al., "Optimal Control of a Ball Mill Grinding Circuit—I. Grinding Circuit Modeling and Dynamic Situation," Chemical Engineering Science, vol. 46, No. 3, 10 pages, Jun. 29, 1990.

Apelt, T.A., "Inferential Measurement Models for Semi-Autogenous Grinding Mills," PhD Thesis, Department of Chemical Engineering, University of Sydney, 364 pages, May 2, 2007.

International Search Report and Written Opinion, Application No. PCT/EP2011/067248, 14 pages, May 31, 2012.

US 9,486,809 B2

USE OF TEMPERATURE MEASUREMENTS FOR INDIRECT MEASUREMENT OF PROCESS VARIABLES IN MILLING SYSTEMS

CROSS-REFERENCE TO RELATED APPLICATIONS

This application is a U.S. National Stage Application of International Application No. PCT/EP2011/067248 filed Oct. 4, 2011, which designates the United States of America, and claims priority to DE Patent Application No. 10 2010 062 204.4 filed Nov. 30, 2010 The contents of which are hereby incorporated by reference in their entirety.

TECHNICAL FIELD

This disclosure relates to milling systems such as e.g. tube mills, ball mills or SAG mills (standing for "semi-autogenous grinding mill") which are suitable for grinding coarse-grained materials such as ores or cement for example.

BACKGROUND

Ore milling and grinding is an important process step in the mining industry. SAG mills and ball mills are generally used for this purpose. In both cases the mills are tube mills or drum mills which, considered in simplified terms, consist of a rotating cylinder (drum) which is filled with the ore that is to be ground. The rotation of the drum causes material that is to be crushed to move upward in the mill and subsequently to fall onto the remaining material on the floor of the mill due to the force of gravity. The impact of the particles as well as the attrition within the circulating charge lead to a disintegration of for example the ore. In many mill systems steel balls are also added to the material in the milling plant in order to improve milling efficiency.

For the purpose of optimal control it is important to be able to measure characteristic variables of the comminution process such as for example the masses of rock and water inside the mill, the material flows into and out of the mill, or the comminution or reduction rate for grinding coarse rock particles into fine rock particles. Due to the harsh conditions within the mill it is generally not easy to conduct direct measurements inside the mill. Furthermore, the large flows of material, in particular in the order of magnitude of thousands of tonnes per hour, cannot be analyzed in detail outside of the mill.

A plurality of (indirect) measuring instruments exist for capturing process variables of milling systems. The input/output mass feeds, the mill weight, the power draw, and the speed of a reduction mill are measured in the conventional manner. Said measurements are typically incorporated in a macroscopic state-space model which takes into account the masses of fractions having different sizes within the mill by means of mass balance equations ([1] [2]).

SUMMARY

One embodiment provides a method for operating a mill having continuous input and output mass flows, comprising the steps: using a process model based on power balance equations having characteristic process variables for ascertaining a status of a mill, a change in an energy content of a mill mass and of masses of a content of the mill in each case corresponding to a difference formed from energy inflow and energy outflow; additionally using a process model based on mass balance equations having mass flows as characteristic process variables for ascertaining the status of the mill, a change in the content masses of the mill in each case corresponding to a difference formed from mass flows into and mass flow out of the mill; measuring characteristic process variables, the measurements being taken outside the mill; estimating respective characteristic process variables by means of insertion of the measured values into a power balance equation having respective mass flows on the assumption that the other process variables in each case are known or can be ignored; and controlling the mill by means of the estimated characteristic process variables.

In a further embodiment, the method comprises measuring a net power output of a mill motor as well as temperatures and mass flows as characteristic process variables, the measurements being taken outside the mill.

In a further embodiment, the method comprises measuring temperatures of materials supplied to the mill and materials exiting the mill in each case as characteristic process variables, the measurements being taken outside the mill.

In a further embodiment, the method comprises measuring mass flows of materials supplied to the mill in each case and/or materials exiting the mill in each case as characteristic process variables, the measurements being taken outside the mill.

In a further embodiment, the method comprises measuring an ambient temperature of the mill as characteristic process variables, the measurement being taken outside the mill, for the purpose of determining a thermal power loss of the mill.

In a further embodiment, the method comprises measuring sound energy radiated from the mill as a characteristic process variable, the measurement being taken outside the mill, for the purpose of determining a sound power loss of the mill.

In a further embodiment, the method comprises estimating a power or energy for fracturing rock compounds and/or for a phase transition for the purpose of determining an effective power output of the mill.

In a further embodiment, the method comprises estimating a mass flow of rock exiting the mill for the purpose of determining an effective power output of the mill.

In a further embodiment, materials supplied to the mill in each case are rock, steel ball and water, and material exiting the mill is a mixture of fractured rock, water and steel balls.

In a further embodiment, the method comprises controlling the mill in such a way that an effective power output of the mill is at a maximum.

Another embodiment provides a mill for performing any of the methods disclosed above, the mill having continuous input and output mass flows, and comprising: a computer device having an integrated process model based on power balance equations having characteristic process variables for ascertaining a status of a mill, a change in an energy content of the mill mass and the content masses thereof in each case corresponding to a difference formed from energy inflow and energy outflow; and the computer device having an additional integrated process model based on mass balance equations having mass flows as characteristic process variables for ascertaining the status of the mill, a change in the content masses of the mill corresponding in each case to a difference formed from mass flows into and mass flow out of the mill; a measuring instrument for measuring characteristic process variables, the measurement being taken outside the mill; the computer device for estimating respective characteristic process variables by means of insertion of the measured values into a respective power balance equation having mass flows on the assumption that the other process variables in each case are known or can be ignored; and a control device for controlling the mill by means of the estimated characteristic process variables.

In a further embodiment, the mill is a tube, ball or SAG mill.

BRIEF DESCRIPTION OF THE DRAWINGS

Exemplary embodiments will be explained in more detail below based on the schematic drawings, wherein.

DETAILED DESCRIPTION

Figure 1:
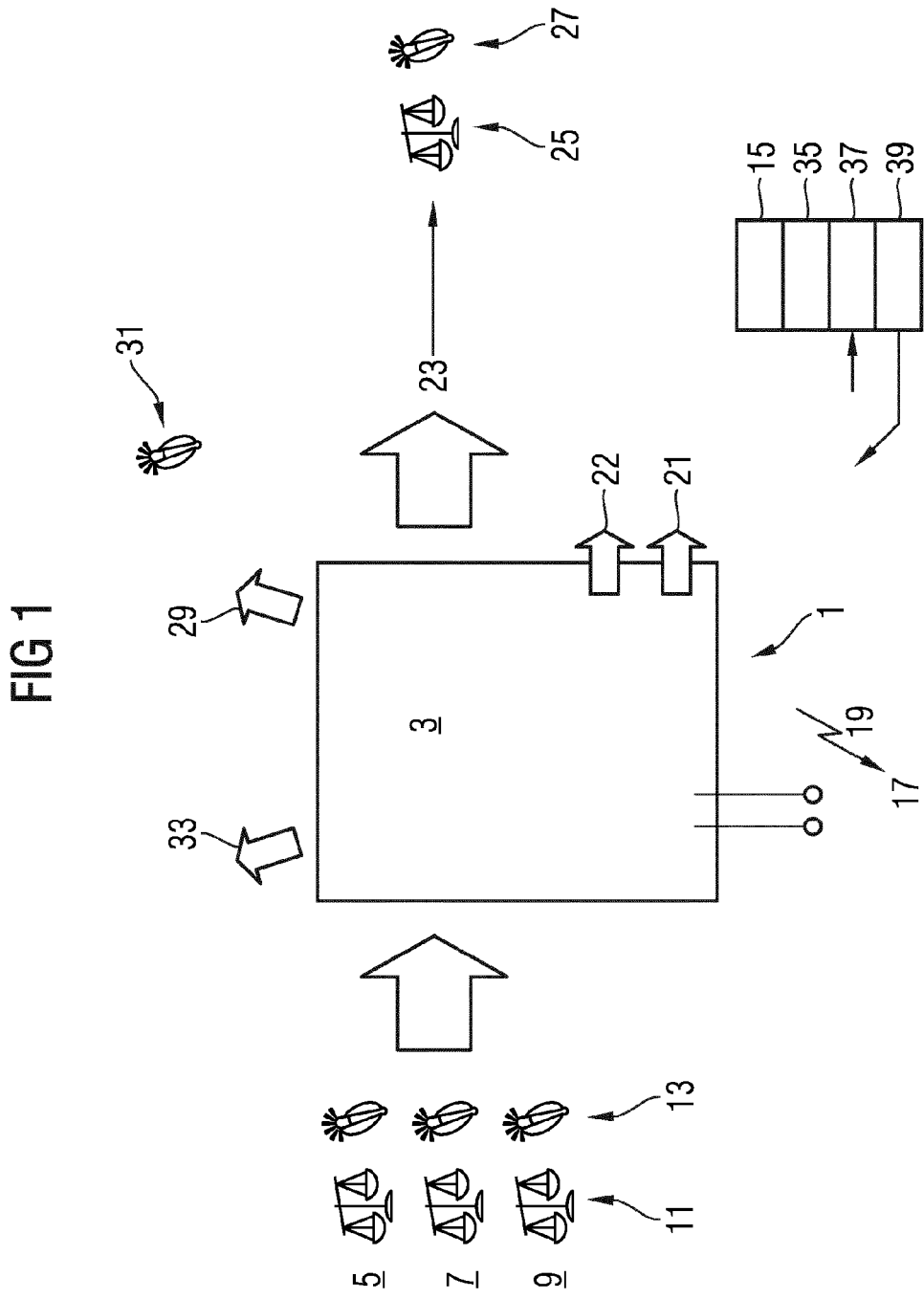
FIG. 1 shows an example milling system according to one embodiment of the invention.

Embodiments of the present disclosure are provided to measure, in a simple and effective way, characteristic process variables of a reduction process in a milling method or a milling system for the purpose of optimal control of the milling process. Characteristic variables of the reduction process can be for example the masses of rock and water inside a mill, the material flows into and out of the mill, or the reduction rate for crushing coarse rock particles into fine rock particles. It is aimed to enable improved process modeling and, on that basis, better control of the reduction process. A principal control objective is to reduce the enormous energy requirements in particular of ore grinding, the most expensive step in ore processing.

Some embodiments provide a method for operating a mill having continuous input and output mass flows is claimed, which comprises the following steps:

using a process model based on power balance equations having characteristic process variables for ascertaining the status of a mill, a change in an energy content of the mill mass and the content masses thereof in each case corresponding to a difference formed from energy inflow and energy outflow;

additionally using a process model based on mass balance equations having mass flows as characteristic process variables for ascertaining the status of a mill, a change in the content masses of the mill in each case corresponding to a difference formed from mass flows into and mass flow out of the mill;

measuring characteristic process variables, the measurements being taken outside the mill;

estimating respective characteristic process variables by means of insertion of the measured values into a respective power balance equation on the assumption that the other process variables in each case are known or can be ignored;

controlling the mill by means of the estimated characteristic process variables.

Other embodiments provide a mill for performing the disclosed method, wherein the mill has continuous input and output mass flows, as well as:

a computer device having an integrated process model based on power balance equations having characteristic process variables for ascertaining the status of a mill, a change in an energy content of the mill mass and the content masses thereof in each case corresponding to a difference formed from energy inflow and energy outflow; and the computer device having an additional integrated process model based on mass balance equations having mass flows as characteristic process variables for ascertaining the status of a mill, a change in the content masses of the mill in each case corresponding to a difference formed from mass flows into and mass flow out of the mill;

a measuring instrument for measuring characteristic process variables, the measurements being taken outside the mill;

the computer device for estimating respective characteristic process variables by means of insertion of the measured values into a respective power balance equation on the assumption that the other process variables in each case are known or can be ignored;

a control device for controlling the mill by means of the estimated characteristic process variables.

According to some embodiments a power balance model or a corresponding energy balance model is proposed for the mill itself. A model of said kind is combined with a mass balance model. In this way unknown characteristic process variables can be estimated to allow effective control of the mill simply by measuring other characteristic process variables outside the mill or ignoring the same.

It has been recognized by the inventors that a combination of a power balance model with mass-balance-based modeling of the mill status is particularly advantageous for achieving the disclosed object. In this way necessary knowledge can be obtained in relation to mass flows which cannot be measured directly. More effective process modeling is made possible.

Additional temperature measurements of the input flows and output flows of mills or milling systems can be used in a power balance model for improved status estimation and for controlling the mill or the milling system.

An advantage of certain disclosed embodiments as compared with other non-temperature-based methods is the simplicity of the temperature measurements, their relative cost-effectiveness and their high degree of accuracy. According to the disclosed method only the temperatures of water-like mass flows need to be measured.

According to one embodiment, a net power output of a mill motor as well as temperatures and mass flows can be measured as characteristic process variables, the measurements being taken outside the mill.

According to another embodiment, temperatures of materials supplied to the mill and materials exiting the mill in each case can be measured as characteristic process variables, the measurements being taken outside the mill.

According to another embodiment, mass flows of materials supplied to the mill in each case and materials exiting the mill in each case can be measured as characteristic process variables, the measurements being taken outside the mill.

According to another embodiment, an ambient temperature of the mill can be measured as a characteristic process variable, the measurement being taken outside the mill, for the purpose of determining a thermal power loss of the mill.

According to another embodiment, the sound energy radiated from the mill can be measured as a characteristic process variable, the measurement being taken outside the mill, for the purpose of determining a sound power loss of the mill.

According to another embodiment, a power or energy for fracturing rock compounds and/or for a phase transition can be estimated for the purpose of determining an effective power output of the mill.

According to another embodiment, a mass flow of rock exiting the mill can be estimated for the purpose of determining an effective power output of the mill.

According to another embodiment, materials supplied to the mill can be rock, steel balls and water, and material exiting the mill can be a mixture of fragmented rock, water and steel balls.

According to another embodiment, the mill can be a tube, ball or SAG mill.

FIG. 1 shows an example milling system according to one embodiment of the invention. The relevant mass and energy flows are depicted.

It is proposed to measure the input and output temperatures of the rock, the steel balls and the water supplied to the mill. These temperatures can then be referred to the input/output mass flows, the power draw, the milling rate and the breakage rate by way of an energy balance. The equation can then be used in different setups for indirect measurement of one of the cited process variables, and moreover on the assumption that other process variables are known. An estimation procedure of said type is incorporated directly into a process model that is based on mass balance equations.

According to this embodiment at least some of the temperatures of the inputs and outputs of the mill are measured, said measurements being used to estimate variables of the reduction process which are not able to be measured directly. This can be achieved by means of energy balancing in conjunction with mass balancing, for example using an extended Kalman filter basic structure. The proposed measurement setup is illustrated schematically in FIG. 1.

The change in the energy content of the mill and the contents thereof, namely rock, water and steel balls, is the net product resulting from the energy inflow and the energy outflow. Situated on the input side are the motor power capacity, less the power loss in the gearshifts and the bearings, and the heat content of the supplied ore, water and steel balls. On the output side is the heat contained in the mill outflow, a mixture of pulverized ore, water and small steel particles. Furthermore the energy required for fracturing material compounds during the milling must be deducted from the total energy. In addition an even greater amount of energy lost during a milling operation for phase transitions of the ore material close to the fracture points must be subtracted. Finally the energy for evaporating water and the energy dissipated from the mill housing in the form either of heat or of sound must be deducted. The resulting net energy is then used for changing the temperature of the mill contents, which is to say the temperature of the rocks, the water, the steel balls, and the body of the mill. Alternatively the energy difference can be stored in the kinetic energy of the particles inside the mill.

FIG. 1 shows a mill 1, which can be for example a tube, ball or SAG mill, represented as a rectangle. The material to be milled, which can be rock 5 or ore for example, is located in an interior space 3 of the mill 1. Steel balls 7 and water 9 are also supplied to the interior space 3. The mass flows and the temperatures of the materials supplied to the mill 1, namely rock 5, steel balls 7 and water 9, are measured by means of measuring instruments which are represented as a pair of scales for the mass flow measurement 11 and as a thermometer for the temperature measurement 13. Furthermore, at least one motor 15 of the mill 1 is supplied with electrical energy or power 17 which can be measured by means of a power meter 19, represented as a zigzag arrow in FIG. 1. Deducting a no-load power of the motor 15 from the total power draw 17 of the motor 15 yields the electromechanical power supplied to the milling process, which corresponds to a product of torque and angular velocity. In this way it is possible to ascertain the mass flows, the thermal energy and the electrical energy supplied to the interior space 3.

An effective energy or effective power output 21 of the mill 1 is the energy 21 that is available for fragmenting compounds. Energy for generating phase transitions from a solid to a liquid state of the material that is to be milled can also be added to the effective energy. The effective energy 21 is represented by a black arrow pointing out of the mill. A further metric for a productive capacity of the mill 1 is the material flow exiting from the mill interior space 3 comprising a mixture 23 of fragmented rock, water and steel balls. The mass flow 23 exiting the mill can be weighed by means of a pair of scales 25 and the temperature thereof can be measured by means of a thermometer 27. Other power losses or energy losses dissipated from the mill interior space 3 are the thermal losses 29, which can be measured by means of a thermometer 31, and sound radiation 33 caused by a movement of the mill.

Power balance equations and mass balance equations can be set up based on FIG. 1 and their evaluation used to achieve optimized control of the mill 1 in terms of a level of efficiency of the mill 1. The mill 1 has the following equipment for that purpose: A computer device 35 having an integrated process model based on power balance equations having characteristic process variables for ascertaining a status of the mill, a change in an energy content of the mill mass and the content masses thereof corresponding in each case to a difference formed from energy inflow and energy outflow, the computer device 35 being provided with an additional integrated process model based on mass balance equations having mass flows as characteristic process variables for ascertaining the status of the mill, a change in the material masses in the interior space 3 of the mill 1 in each case corresponding to a difference formed from mass flows into and mass flow out of the mill 1. The computer device 35 estimates respective characteristic process variables by means of insertion of measured values into a respective power balance equation on the assumption that the other process variables in each case are known or can be ignored. A measuring instrument 37 comprising measuring devices 11, 13, 19, 25, 27, 31, 33 for measuring characteristic process variables 5, 7, 9, 17, 23, 29, 33, the measurements being taken outside the mill interior space 3. A control device 39 for controlling the mill 1 by means of the estimated characteristic process variables. Arrow 22 represents losses due to evaporation of water.

Figure 2:
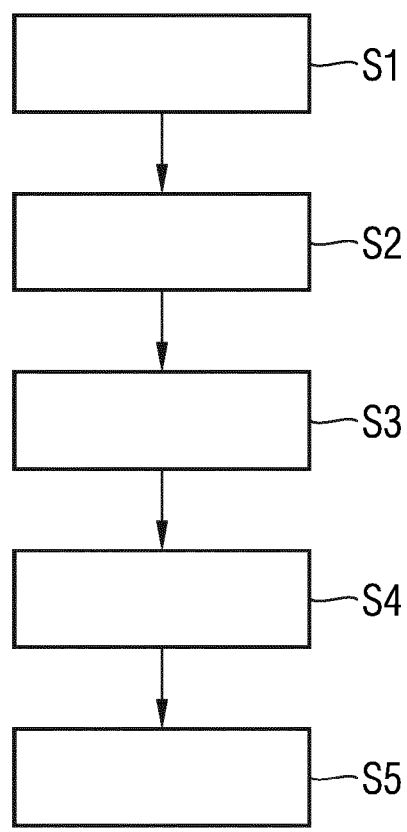
FIG. 2 shows an example method according to one embodiment.

FIG. 2 shows an example method according to one embodiment.

According to the exemplary embodiment, a mill is considered based on the following assumptions:

1) The mill contents and the mill body are perfectly mixed, i.e. they have a uniform temperature for all parts. Changes in temperature are slow enough to allow this equilibrium to be maintained.

2) All kinetic energy is immediately converted into heat and compound fracturing energy. This is realistic because a typical mill filling movement is fast in comparison with the milling processes. With only few collisions, most of the kinetic energy of the particles is lost in inelastic collisions.

3) Gravitational energy of the charge is negligible.

4) No water evaporates.

In that case the following equation (1) applies:

$$\frac{dE}{dt} = (P_{Motor} - P_{Motor,no\_load}) - P_{Compound\_fracture+Phase\_transition} -$$
$$P_{Thermal\_losses} - P_{Sound} + C_{Rock}(F_{Rock}T_{Rock,in} - O_{Rock}T) +$$
$$C_{Water}(F_{Water}T_{Water,in} - O_{Water}T) + C_{Ball}F_{Ball}T_{Ball,in} =$$
$$(C_{Rock}m_{Rock} + C_{Water}m_{Water} + C_{Ball}m_{Ball} + C_{Mill}m_{Mill})\frac{dT}{dt}$$

where P denotes power outputs in KW, F the feed rates in t/h, O the output rates in t/h, c the mass-specific thermal capacities in kWh/tK, T the temperatures in K, and m the masses in the mill.

According to this specification, two different strategies are applied for using additional temperature measurements for process control in reduction mills.

The first strategy estimates the power $P_{Compound\_fracture+Phase\_transition}$ directly. This knowledge would be extremely useful since it allows direct access to the reduction efficiency, in other words to the proportion of the motor energy actually used for producing small particles and not wasted for heating the material. Acquiring this knowledge directly from temperature measurements is not known according to the prior art. For directly estimating the power $P_{Compound\_fracture+Phase\_transition}$ it is assumed that the masses in the mill are estimated by means of parallel mass balance equations, and that the net energy consumption, i.e. motor power capacity minus no-load power, the input/output mass rates and temperatures, is measured. The setup is illustrated in FIG. 1. The thermal loss of the mill housing can then be estimated by applying Newton's law of cooling. The sound energy can typically be ignored. Finally the power or energy required for fracturing compounds or used for phase transitions can be obtained directly, and moreover by means of the above equation (1).

It is however known that the reduction efficiencies in ball/SAG mills tend to be small. They lie at around 10% if the energy required for fracturing particles in a ball/SAG mill is compared with that of individual particle fracture experiments. Individual particle fracture experiments provide a useful comparison, since in this case no surrounding material is heated up and the requisite energy is largely identical to the energy necessary for fracturing compounds or adhesions and for phase transitions. Consequently this first approach is not possible for every mineral processing plant due to the rather large inaccuracies expected when the temperatures and the mass rates of the inputs into the mill and the outputs from the mill are measured.

If this first approach proves impracticable, another, more robust scenario is proposed as follows: It is again assumed that the masses in the mill are estimated by means of parallel mass balance equations, and that the net motor power capacity, input mass rates and the temperatures of the inputs and outputs are measured. By using Newton's equations to calculate the thermal loss of the mill housing and ignoring the energy used for fracturing compounds or adhesions and the sound energy it is then possible to estimate the output rock flow rate, which is a further key variable for control purposes.

In this case a method for operating a mill having continuous input and output mass flows can particularly advantageously comprise the following steps:

step S1: using a process model based on power balance equations having characteristic process variables for ascertaining a status of a mill, a change in an energy content of the mill mass and the content masses thereof in each case corresponding to a difference formed from energy inflow and energy outflow;

step S2: additionally using a process model based on mass balance equations having mass flows as characteristic process variables for ascertaining the status of the mill, a change in the content masses of the mill in each case corresponding to a difference formed from mass flows into and mass flow out of the mill;

step S3: measuring characteristic process variables, the measurements being taken outside the mill;

step S4: estimating respective characteristic process variables by means of insertion of the measured values into a respective power balance equation on the assumption that the other process variables in each case are known or can be ignored;

step S5: controlling the mill by means of the estimated characteristic process variables.

LITERATURE

[1] Rajamani, R. K. and Herbst, J., Optimal control of a ball mill grinding circuit—I: Grinding circuit modeling and dynamic simulation, Chemical Engineering Science, 46(3), 861-70, 1991

[2] T. A. Apelt, Inferential Measurement Models for SAG Mills, Ph.D. Thesis, 2007.

What is claimed is:

1. A method for grinding a coarse-ground material with a mill, the method comprising:

providing a continuous input mass flow to the mill including at least the coarse-ground material and a fluid;

grinding the coarse-ground material in the mill into fractured material of a desired size;

estimating a mass flow of the fractured material exiting the mill based at least on an amount of fluid exiting the mill;

using a process model based on power balance equations having characteristic process variables for ascertaining a status of the mill, a change in an energy content of a mill mass and of masses of a content of the mill in each case corresponding to a difference formed from energy inflow and energy outflow;

additionally using a process model based on mass balance equations having mass flows as characteristic process variables for ascertaining the status of the mill, a change in the content masses of the mill in each case corresponding to a difference formed from mass flows into and mass flow out of the mill;

measuring characteristic process variables, the measurements being taken outside the mill;

estimating respective characteristic process variables by inserting the measured values into a power balance equation having respective mass flows on the assumption that the other process variables in each case are known or can be ignored; and controlling the mill by means of the estimated characteristic process variables.

2. The method of claim 1, comprising measuring a net power output of a mill motor as well as temperatures and mass flows as characteristic process variables, the measurements being taken outside the mill.

3. The method of claim 2, comprising measuring temperatures of each material supplied to the mill and each material exiting the mill as characteristic process variables, the measurements being taken outside the mill.

4. The method of claim 3, comprising measuring mass flows of each material supplied to the mill or each material exiting the mill as characteristic process variables, the measurements being taken outside the mill.

5. The method of claim 1, comprising measuring an ambient temperature of the mill as a characteristic process variable, the measurement being taken outside the mill, for the purpose of determining a thermal power loss of the mill.

6. The method of claim 1, comprising measuring sound energy radiated from the mill as a characteristic process variable, the measurement being taken outside the mill, to determine a sound power loss of the mill.

7. The method of claim 1, comprising estimating a power or energy for fracturing rock compounds to determine an effective power output of the mill.

8. The method of claim 1, comprising estimating a mass flow of rock exiting the mill to determine an effective power output of the mill.

9. The method of claim 1, wherein materials supplied to the mill comprise rock, steel ball, and water, and materials exiting the mill comprises a mixture of fractured rock, water, and steel balls.

10. The method of claim 1, comprising controlling the mill in such a way that an effective power output of the mill is at a maximum.

11. A mill having continuous input and output mass flows, the mill comprising:
   a drum including a rotating cylinder;
   an inlet to the drum providing the continuous input mass flow comprising at least coarse-ground material and a first amount of fluid;
   an outlet from the drum providing the continuous output mass flow comprising at least fractured material and a second amount of fluid;
   a computer device having an integrated process model based on power balance equations having characteristic process variables for ascertaining a status of the mill, a change in an energy content of the drum mass and the content masses thereof in each case corresponding to a difference formed from energy inflow and energy outflow; and
   the computer device having an additional integrated process model based on mass balance equations having mass flows as characteristic process variables for ascertaining the status of the mill, a change in the content masses of the drum corresponding in each case to a difference formed from mass flows into and mass flow out of the drum;
   a measuring instrument configured to measure characteristic process variables, the measurement being taken outside the drum;
   the computer device being configured to estimate respective characteristic process variables by inserting the measured values into a respective power balance equation having mass flows on the assumption that the other process variables in each case are known or can be ignored; and
   a control device for configured to control rotation of the drum by means of the estimated characteristic process variables.

12. The system as claimed in claim 11, wherein the mill comprises a tube mill, a ball mill, or an SAG mill.

13. The system of claim 11, wherein the measuring instrument is configured to measure a net power output of a mill motor as well as temperatures and mass flows as characteristic process variables, the measurements being taken outside the drum.

14. The system of claim 13, wherein the measuring instrument is configured to measure temperatures of each material supplied to the drum and each material exiting the drum as characteristic process variables, the measurements being taken outside the drum.

15. The system of claim 14, wherein the measuring instrument is configured to measure mass flows of each material supplied to the drum or each material exiting the drum as characteristic process variables, the measurements being taken outside the drum.

16. The system of claim 11, wherein the measuring instrument is configured to measure an ambient temperature of the drum as a characteristic process variable, the measurement being taken outside the drum, for the purpose of determining a thermal power loss of the drum.

17. The system of claim 11, wherein the measuring instrument is configured to measure sound energy radiated from the drum as a characteristic process variable, the measurement being taken outside the drum, to determine a sound power loss of the drum.

18. The system of claim 11, wherein the computer device is configured to estimate a power or energy for fracturing rock compounds to determine an effective power output of the drum.

19. The system of claim 11, wherein the computer device is configured to estimate a mass flow of rock exiting the drum to determine an effective power output of the drum.

20. The system of claim 11, wherein materials supplied to the drum comprise rock, steel ball, and water, and materials exiting the drum comprises a mixture of fractured rock, water, and steel balls.

* * * * *